United States Patent [19]
Araki

[11] Patent Number: 5,909,413
[45] Date of Patent: Jun. 1, 1999

[54] OPTICAL PICKUP APPARATUS HAVING CROSSTALK BALANCE AND TILT CORRECTION

[75] Inventor: Yoshitsugu Araki, Tsurugashima, Japan

[73] Assignee: Pioneer Electronic Corporation, Tokyo, Japan

[21] Appl. No.: 08/865,894

[22] Filed: May 30, 1997

[30] Foreign Application Priority Data

Jun. 14, 1996 [JP] Japan .................................. 8-153564

[51] Int. Cl.⁶ ........................................................ G11B 7/00
[52] U.S. Cl. .................... 369/44.32; 369/124; 369/44.34
[58] Field of Search ............................. 369/44.32, 44.37, 369/44.41, 54, 124, 44.34

[56] References Cited

U.S. PATENT DOCUMENTS

| | | | |
|---|---|---|---|
| 5,544,141 | 8/1996 | Kawasaki | 369/44.34 |
| 5,546,367 | 8/1996 | Yoshimura et al. | 369/44.32 |
| 5,642,341 | 6/1997 | Stork | 369/44.41 |
| 5,703,855 | 12/1997 | Kirino et al. | 369/54 |
| 5,719,847 | 2/1998 | Tateishi et al. | 369/44.32 |

*Primary Examiner*—Thang V. Tran
*Attorney, Agent, or Firm*—Sughrue, Mion, Zinn, Macpeak & Seas, PLLC

[57] ABSTRACT

An optical pickup apparatus in which a difference between a crosstalk amount to a desired track to be read on an optical disc by a signal recorded on a track locating on an inner circumference of the desired track and a crosstalk amount to a desired track by the signal recorded on the track locating on an outer circumference of the desired track is generated as a tilt error signal value indicative of the occurrence of an aberration, and the aberration is optically corrected on the basis of the tilt error signal value. Thus, the crosstalk can be sufficiently reduced even for the optical disc with a high recording density.

7 Claims, 5 Drawing Sheets

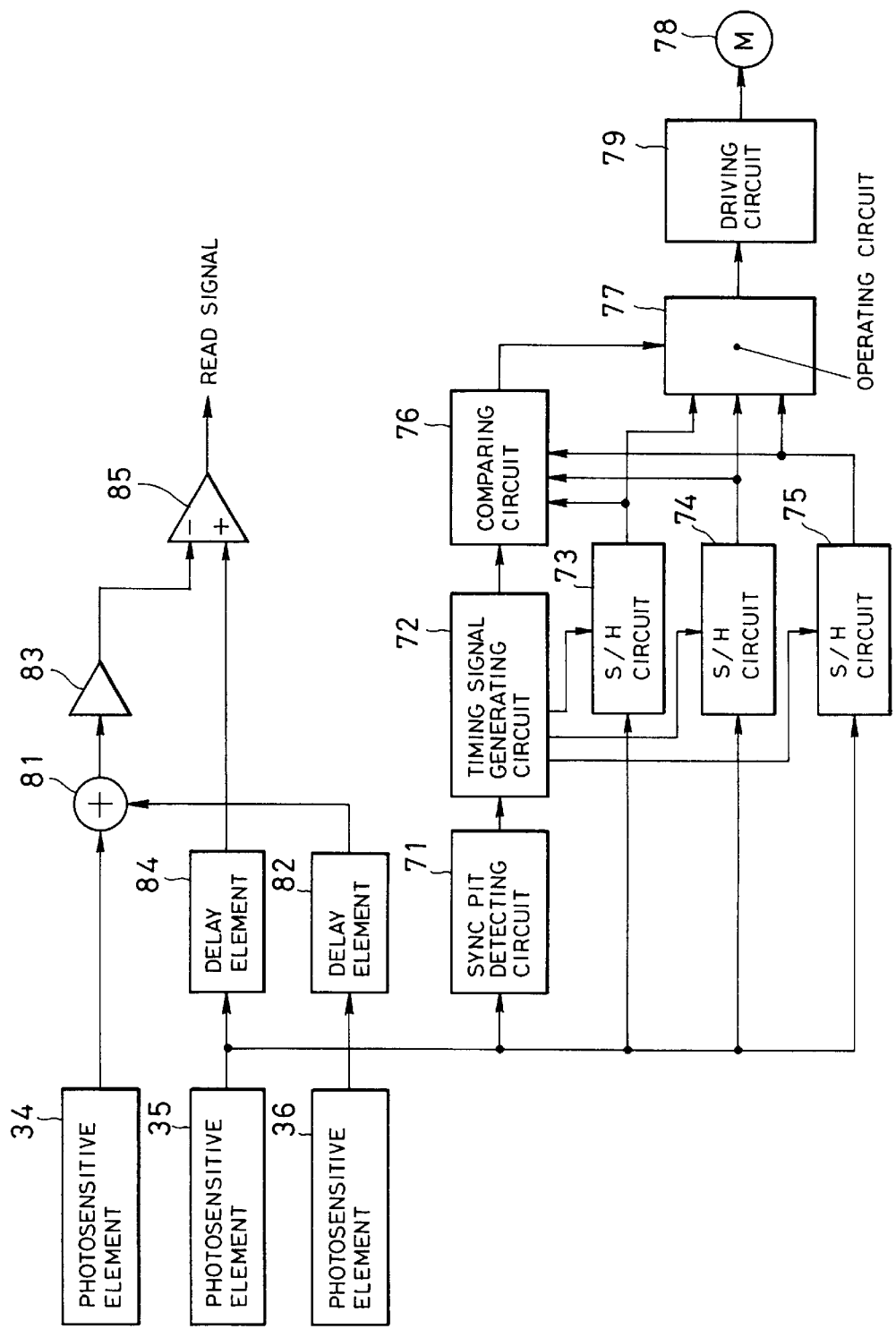

DISC ROTATING DIRECTION
←

DISC ROTATING DIRECTION
←

DISC ROTATING DIRECTION
←

OPTICAL PICKUP APPARATUS HAVING CROSSTALK BALANCE AND TILT CORRECTION

BACKGROUND OF THE INVENTION

1. Field of the Invention

The present invention relates to an optical pickup apparatus for writing or reading an information signal such as a video signal, an audio signal and a computer data signal to/from an optical recording medium such as an optical disc.

2. Description of the Related Art

Studies of a high density recording of an information signal including not only an audio signal but also a video signal or computer data on an optical disc are advancing. For example, in case of recording an information signal including a video signal of a movie of about two hours to an optical disc having a size of a well-known compact disc on which only an audio signal has been recorded, recording density of the optical disc has to be set to an extremely high density. In order to accomplish high density recording, a method of narrowing an interval between tracks on each of which the information signal is recorded is considered. When the interval between tracks, that is, a track pitch is decreased, there is a problem such that a crosstalk amount which is mixed in the information signal increases, thereby deteriorating a quality of a reproduced information signal. Especially, when the optical disc is inclined to an optical axis, that is, when there is a tilt in the optical disc, the crosstalk amount from one of neighboring tracks increases and a situation such that the signal cannot be preferably reproduced occurs.

The crosstalk occurring due to the existence of the tilt of the optical disc is principally caused by a coma aberration shown by the following equation (1).

$$\text{coma aberration} = \frac{t \times NA^3 \times \theta \times (n^2 - 1)}{2n \times \lambda} \qquad (1)$$

where, t : disc thickness

NA: numerical aperture of an objective lens

θ: tilt angle of the disc n: refractive index of the disc

λ: reproduction wavelength

It will be understood from the equation (1) is that an occurrence amount of the coma aberration is proportional to the cube of the numerical aperture NA of the objective lens and is inversely proportional to the reproduction wavelength λ even in the case of the same disc tilt angle θ. In an optical disc such as a DVD (digital video disc) on which a digital information signal has been recorded, since it is necessary to increase the numerical aperture NA to, for example, 0.6 in order to realize the high density recording, a method of setting the reproduction wavelength λ to a short wavelength. However, when the reproduction wavelength λ is set to be shorter than a present value, it is beyond the limit of the disc manufacturing technique. Consequently, there is no way except a decrease in numerical aperture NA of the objective lens and this obstructs the realization of a high recording density of the optical disc. It is, therefore, difficult to reduce the coma aberration due to the set values of the numerical aperture NA and reproduction wavelength λ for the purpose of the realization of the high recording density of the optical disc.

In a conventional pickup apparatus, a tilt sensor for detecting an inclination of the disc is provided in order to reduce the crosstalk, and a tilt servo control for controlling the inclination of the optical axis to the optical disc in accordance with a tilt detection amount detected by the tilt sensor is executed.

FIG. 1 shows a tilt sensor which is used for a conventional pickup apparatus. In the tilt sensor, a light emitting diode 11 generates a beam for detecting a tilt of a disc to a disc 12. Photodetectors 13 and 14 are arranged at both side positions of the light emitting diode 11 in the radial direction of the disc and receive a light reflected from the disc 12, respectively. Photosensitive level signals of the photodetectors 13 and 14 are supplied to a differential amplifier 15 and a difference between the level signals is obtained. For example, when the disc 12 is tilted so that the right side thereof goes down in the diagram, the output level of the photodetector 13 increases and the output level of the photodetector 14 decreases, so that the tilt of the disc can be detected from the level difference. An output signal of the differential amplifier 15 is supplied to a driving mechanism for adjusting a tilt of a whole pickup and the tilt of the whole pickup is automatically adjusted so as to correct the tilt detected by a disc tilt detector.

The tilt sensor, however, requires a space of a certain size, so that it cannot be arranged at a converging position of a reproducing beam. The tilt sensor, consequently, detects the tilt at a position different from a reproducing (recording) position. According to such an indirect method, it cannot be said that accurate correction is executed. A change in output due to aging changes of the tilt sensor, pickup, and the like also disturbs the accurate correction.

This results in a problem especially in playing an optical disc of a high density recording which requires the correction of the crosstalk as a prerequisite.

OBJECTS AND SUMMARY OF THE INVENTION

The invention is made in consideration of the above circumstances and it is an object of the invention to provide an optical pickup apparatus which can sufficiently reduce a crosstalk even for an optical disc in which a high recording density is realized.

According to the present invention, there is provided an optical pickup apparatus for optically reading a signal recorded on tracks of an optical disc by using an optical beam, comprising: crosstalk balance operating means for generating a difference between a crosstalk amount of a signal recorded on a track locating on an inner rim of a desired track to be read on the optical disc to the desired track and a crosstalk amount of a signal recorded on a track locating on an outer rim side of the desired track to the desired track as a tilt error signal value indicating the occurrence of an aberration; and correcting means for optically correcting the aberration on the basis of the tilt error signal value.

BRIEF DESCRIPTION OF THE DRAWINGS

FIG. 4 is a circuit block diagram of the pickup apparatus according to the present invention;

DETAILED DESCRIPTION OF THE PREFERRED EMBODIMENT

An embodiment of the invention will now be described in detail hereinbelow with reference to the drawings.

Figure 1:
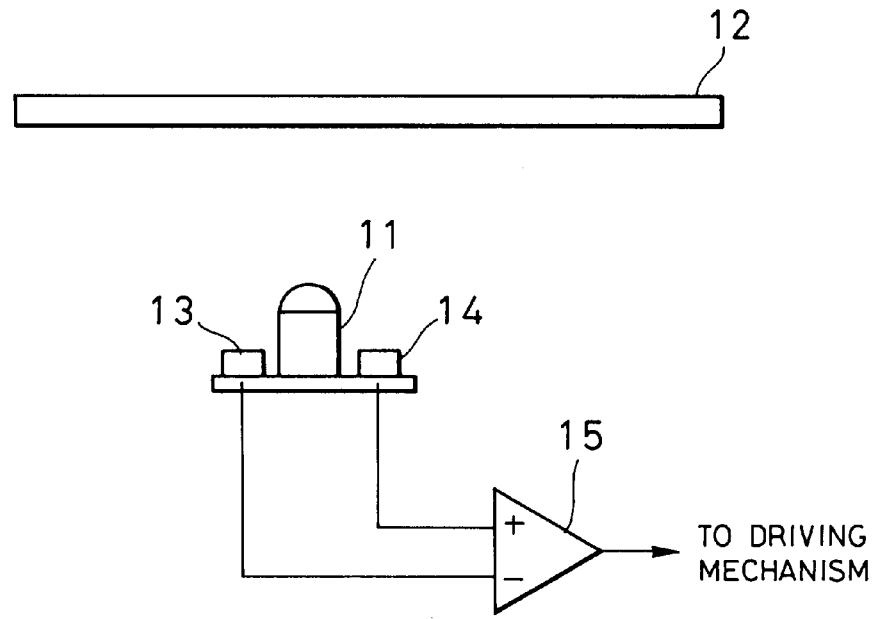
FIG. 1 is a diagram showing a tilt sensor which is used for a conventional pickup apparatus.
Figure 2:
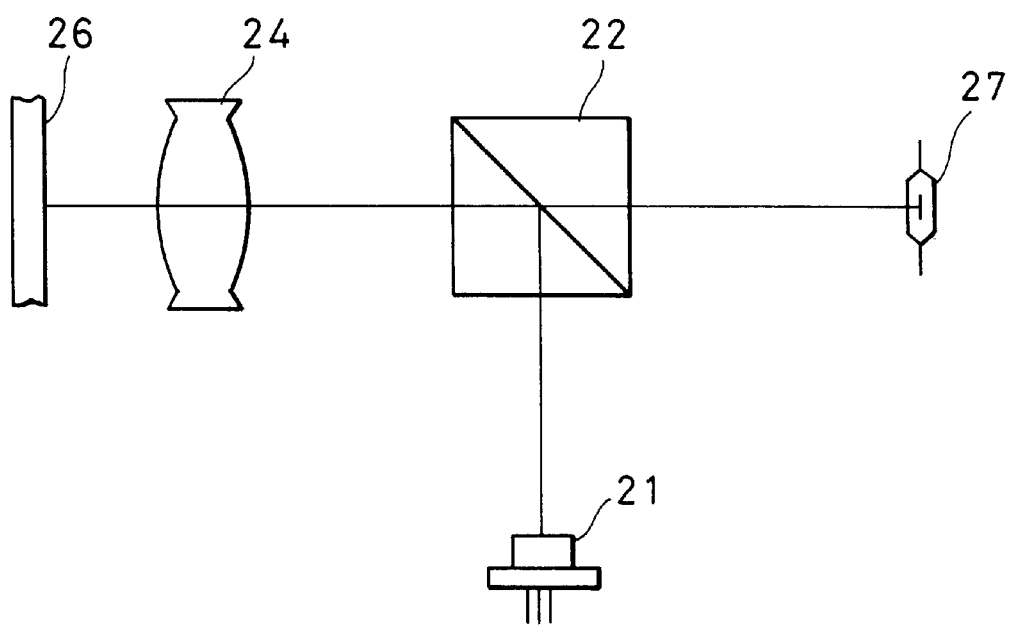
FIG. 2 is a schematic diagram showing an optical system of an optical pickup apparatus according to the present invention.

FIG. 2 shows an optical system of an optical pickup apparatus which is used for an optical disc player according to the present invention. In the pickup apparatus, a light source 21 is driven by a driving circuit (not shown) and emits three laser beams. The laser beams emitted from the light source 21 are reflected by a beam splitter 22 and, after that, reach an objective lens 24. The objective lens 24 converges the laser beams onto a recording surface of an optical disc 26. On the recording surface of the optical disc 26, three neighboring tracks are individually irradiated by the three laser beams, and a spot light is formed on each of the tracks. The light beams reflected by the recording surface of the optical disc 26, that is, the reflected lights are converted to parallel laser beams by the objective lens 24, linearly pass through the beam splitter 22, and reach a photodetector 27.

The photodetector 27 has three photosensitive elements 34 to 36 as shown in FIG. 4. Each of the photosensitive elements 34 to 36 receives any one of the three reflected lights from the disc 26.

Figure 3:
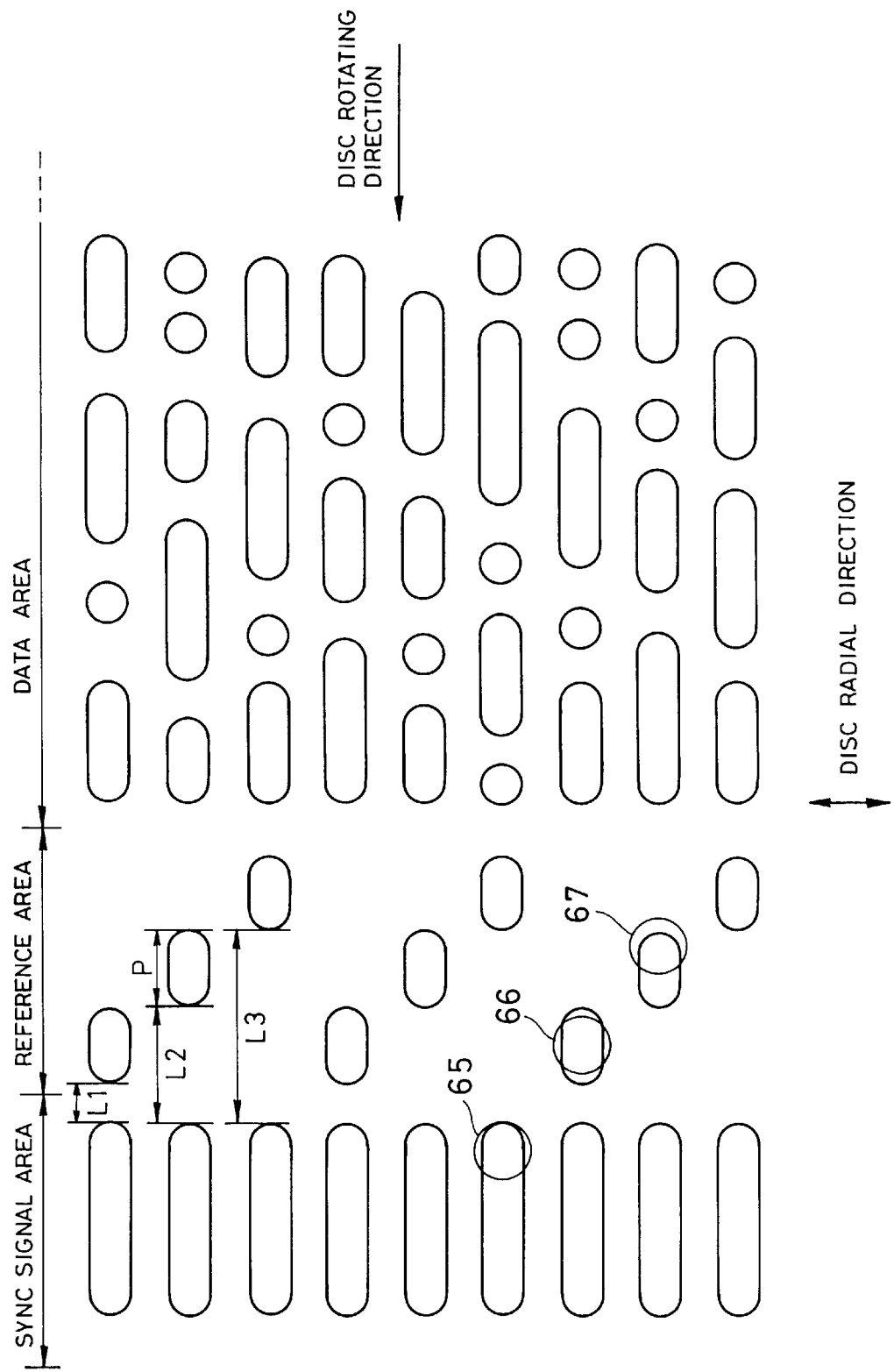
FIG. 3 is a diagram showing a pit train on each track of an optical disc.

As shown in FIG. 3, a sync signal area, a reference area, and a data area are sequentially formed on every segment on the disc 26. A sync pit in the sync signal area is provided so that the other pits in the segment are synchronously read, and has a pit length longer than the maximum inversion interval of pits in the other areas. The same pattern is repeatedly formed in the reference area every three tracks which are neighboring in the disc radial direction. Only one reference pit having a pit length of P is formed in each of the three tracks. The reference pit is formed apart from the rear edge of the sync pit by only a distance L1 on the inner circumferential side track of the three tracks. In the central track, the reference pit is located apart from the rear edge of the sync pit by only at least a distance L2. On the outer circumferential side track of the three tracks, the reference pit is located apart from the rear edge of the sync pit by only a distance L3. Assuming that the pit length of the reference pit is set to P, for example $L2 \geq L1+P$ and $L3 \geq L2+P$. As for arrangement of the reference pits in the reference area, although the same pattern of every three tracks in the disc radial direction needs to be repeated, it is sufficient that the reference pit is arranged at a position such that when one reference pit is read, a crosstalk component by the reference pit on the adjacent track is not included in the read signal.

Spot lights 65 to 67 are formed on the disc 26 by the three laser beams emitted from the light source 21, as shown in FIG. 3. That is, the spot light 65 is located on one track on the inner circumferential side of the disc 26, the spot light 66 is located on the track on the outer side of the above track, and the spot light 67 is located on the outermost track. Those spot lights 65 to 67 are not formed in the same radial direction of the disc. Among the spot lights 65 to 67 in the disc tangential direction, the spot light 67 exists at the most preceding position and the spot light 65 exists at the most delayed position. A distance between the spot lights 65 and 66 and a distance between the spot lights 66 and 67 are equal. The photosensitive element 34 receives a reflected light of the spot light 65, the photosensitive element 35 receives a reflected light of the spot light 66, and the photosensitive element 36 receives a reflected light of the spot light 67.

FIG. 4 shows an RF signal producing circuit including a crosstalk detecting circuit. In the RF signal producing circuit, a sync pit detecting circuit 71 is connected to the photosensitive element 35. When a pit having the maximum pit length is detected, the sync pit detecting circuit 71 discriminates the pit as a sync pit and generates a sync pit detection signal at a time point when the rear edge of the sync pit is detected. A timing signal generating circuit 72 is connected to the sync pit detecting circuit 71. The timing signal generating circuit 72 generates four timing signals in response to the sync pit detection signal. The first timing signal is generated at a time point when a time necessary for the spot light to move on the tracks by only a distance of (L1+P/2) since the generation of the sync pit detection signal elapses. The second timing signal is generated at a time point when a time necessary for the spot light to move on tracks by only a distance of (L2+P/2) since the generation of the sync pit detection signal elapses. The third timing signal is generated at a time point when a time necessary for the spot light to move on tracks by only a distance of (L3+P/2) since the generation of the sync pit detection signal elapses. The fourth timing signal is generated after the third timing signal with a short delay time.

Three sampling and holding (S/H) circuits 73 to 75 are also connected to the photosensitive element 35. The sampling and holding circuit 73 holds and generates an output level of the photosensitive element 35 in response to the first timing signal. The sampling and holding circuit 74 holds and generates an output level of the photosensitive element 35 in response to the second timing signal. The sampling and holding circuit 75 holds and generates an output level of the photosensitive element 35 in response to the third timing signal. A comparing circuit 76 and an operating circuit 77 are connected to the holding outputs of the sampling and holding circuits 73 to 75. The comparing circuit 76 compares the output levels of the sampling and holding circuits 73 to 75 in accordance with the fourth timing signal and generates a discrimination signal indicative of a sampling and holding circuit which generated the maximum level among the sampling and holding circuits 73 to 75. The operating circuit 77 executes a subtraction between the two output levels among the output levels of the sampling and holding circuits 73 to 75 in accordance with the discrimination signal.

A driving circuit 79 for driving a tilt controlling motor 78 is connected to an output of the operating circuit 77. In order to adjust the tilt of the pickup apparatus to the disc 26, the pickup apparatus is driven by the tilt controlling motor 78 around a predetermined axis as a center within a predetermined angle in the disc radial direction.

In the RF signal producing circuit, an adder 81 is provided. The photosensitive element 34 is connected to one input of the adder 81 and the photosensitive element 36 is connected to the other input via a delay element 82. A multiplier 83 is connected to an output of the adder 81. The multiplier 83 multiplies an output value of the adder 81 with K/2 (K is a constant). A delay element 84 is connected to an output of the photosensitive element 35. Further, a subtractor 85 is connected to the multiplier 83 and delay element 84. The subtractor 85 subtracts an output level of the multiplier 83 from an output level of the delay element 84. An output signal of the subtractor 85 is a read signal serving as an RF signal. The delay elements 82 and 84 are provided in order to compensate for the fact that the spot lights 65 to 67 don't exist on the same radius. A delay time by the delay element 82 is a time necessary for the light spot to move a distance which is twice as long as a distance S between the spot lights in the disc tangential direction. A delay time by the delay element 84 is a time necessary for the light spot to move the distance S between the spot lights in the disc tangential direction.

With the above construction, the disc 26 rotates in the disc rotating direction shown by an arrow in FIG. 3. The three spot lights 65 to 67 formed on the disc 26 by the irradiation of the beam lights travel in the direction opposite to the arrow in FIG. 3. In a state where the center spot light 66 of the spot lights 65 to 67 is advanced to the sync signal area, an output level by the sync pit is generated in an output of the photosensitive element 35 for receiving a reflected light of the spot light 66.

In each of the photosensitive elements 34 to 36, a light reflected from a land portion on the disc is bright. The reflected light becomes dark as the amount of pit area in the spot light increases. Since an inverting buffer (not shown) is inserted in each of the outputs of the photosensitive elements 34 to 36, however, the output levels of the photosensitive elements 34 to 36 rise as the amount of pit area increases.

Figure 6:
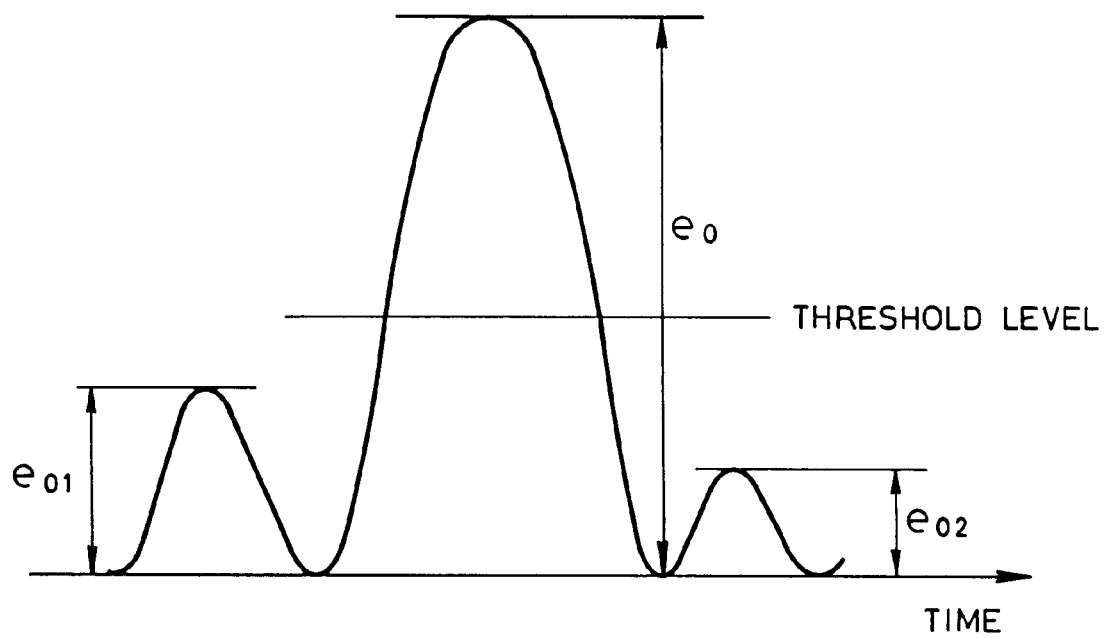
FIG. 6 is a waveform diagram showing an example of an output level change of a photosensitive element.

When the output level of the photosensitive element 35 is raised by the reflected light by the sync pit and exceeds a threshold value as shown in FIG. 6, the sync pit detecting circuit 71 detects the length of the pit. When the length of the pit exceeds a predetermined pit length (for example, 11T, and T denotes a unit pit length), the sync pit detecting circuit 71 discriminates that the pit is a sync pit, and generates a sync pit detection signal when the output level of the photosensitive element 35 is lower than the threshold value.

The sync pit detection signal is supplied to the timing signal generating circuit 72 and a first timing signal is generated at the time point when the time necessary for the spot light 66 to move on the track by only a distance of (L1+P/2) elapses since the generation of the sync pit detection signal. The first timing signal is generated at a time point corresponding to a reference pit existing at a position closest to the sync pit among three kinds of reference pits in the reference area after the spot light 66 was progressed into the reference area. The output level of the photosensitive element 35 is held in the sampling and holding circuit 73 in response to the first timing signal.

A second timing signal is generated at a time point when the time necessary for the spot light to move on the track by only a distance of (L2+P/2) elapses since the generation of the sync pit detection signal. The second timing signal is generated at a time point corresponding to a reference pit existing at a second position closest to the sync pit among the three kinds of reference pits in the reference area. The output level of the photosensitive element 35 is held in the sampling and holding circuit 74 in response to the second timing signal.

Further, a third timing signal is generated at a time point when the time necessary for the spot light to move on the track by only a distance of (L3+P/2) elapses since the generation of the sync pit detection signal. The third timing signal is generated at a time point corresponding to a reference pit existing at a furthest position from the sync pit among the three kinds of reference pits in the reference area. The output level of the photosensitive element 35 is held in the sampling and holding circuit 75 in response to the third timing signal.

After the generation of the third timing signal, since the outputs held in the sampling and holding circuits 73 to 75 have been obtained therefrom in response to the first to third timing signals, respectively, the comparing circuit 76 compares the holding levels of the sampling and holding circuits 73 to 75 in response to a fourth timing signal generated from the timing signal generating circuit 72 just after the generation of the third timing signal. The maximum value among the holding levels is the level by the reference pit of the track to be read by the photosensitive element 35. The comparing circuit 76 generates a discrimination signal indicative of the sampling and holding circuit which generated the maximum value among the sampling and holding circuits 73 to 75.

Figure 5A:
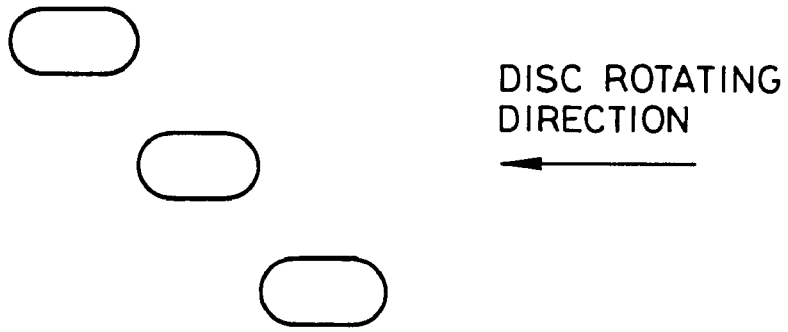
FIGS. 5A to 5C are diagrams showing arrangement types of reference pits.
Figure 5B:
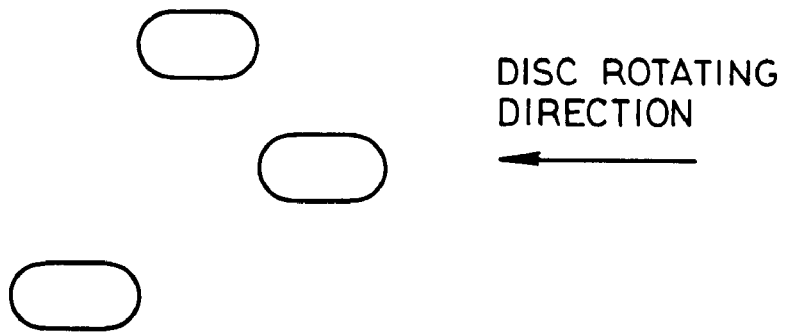
Figure 5C:
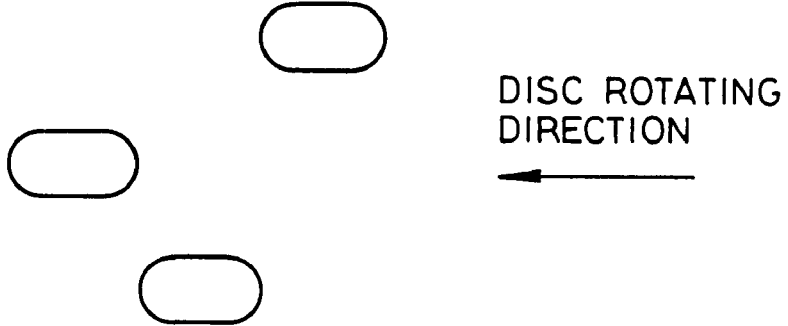

As arrangement types of the three spots lights 65 to 67, that is, the three reference pits to which the photosensitive elements 34 to 36 are related, there are three kinds of types shown in FIGS. 5A to 5C. In the case of the arrangement type of FIG. 5A, the photosensitive element 34 corresponds to a track having the reference pit at the position closest to a sync pit, the photosensitive element 35 corresponds to a track having the reference pit existing at the second position closest to a sync pit, and the photosensitive element 36 corresponds to a track having the reference pit existing at the farthest position from a sync pit. In the case of the arrangement type of FIG. 5B, the photosensitive element 34 corresponds to a track having the reference pit existing at the second position closest to a sync pit. The photosensitive element 35 corresponds to a track having the reference pit existing at the farthest position from a sync pit. The photosensitive element 36 corresponds to a track having the reference pit existing at the position closest to a sync pit. In the case of the arrangement type of FIG. 5C, the photosensitive element 34 corresponds to a track having the reference pit existing at the farthest position from a sync pit. The photosensitive element 35 corresponds to a track having the reference pit existing at the position closest to a sync pit. The photosensitive element 36 corresponds to a track having the reference pit existing at the second position closest to a sync pit.

When the discrimination signal generated from the comparing circuit 76 indicates the sampling and holding circuit 73, it shows that the arrangement type of FIG. 5C is used. A level $e_{01}$ indicative of a crosstalk amount from the neighboring track on the inner side of the disc is held in the sampling and holding circuit 75. A level $e_{02}$ indicative of a crosstalk amount from the neighboring track on the outer side of the disc is held in the sampling and holding circuit 74. The operating circuit 77 subtracts the output level $e_{02}$ of the sampling and holding circuit 74 from the output level $e_{01}$ of the sampling and holding circuit 75 in accordance with the discrimination signal.

When the discrimination signal indicates the sampling and holding circuit 74, it shows that the arrangement type of FIG. 5A is used. The level $e_{01}$ indicative of the crosstalk amount from the neighboring track on the inner side of the disc is held in the sampling and holding circuit 73. The level $e_{02}$ indicative of the crosstalk amount from the neighboring track on the outer side of the disc is held in the sampling and holding circuit 75. FIG. 6 shows an example of a change in level generated from the photosensitive element 35 in case of the arrangement type of FIG. 5A. The operating circuit 77 subtracts the output level $e_{02}$ of the sampling and holding circuit 75 from the output level $e_{01}$ of the sampling and holding circuit 73 in accordance with the discrimination signal.

When the discrimination signal indicates the sampling and holding circuit 75, it shows that the arrangement type of FIG. 5B is used. The level $e_{01}$ indicative of the crosstalk amount from the neighboring track on the inner side of the disc is held in the sampling and holding circuit 74. The level $e_{02}$ indicative of the crosstalk amount from the neighboring track on the outer side of the disc is held in the sampling and holding circuit 73. The operating circuit 77 subtracts the output level $e_{02}$ of the sampling and holding circuit 73 from the output level $e_{01}$ of the sampling and holding circuit 74 in accordance with the discrimination signal.

In the operating circuit 77, therefore, the calculation of $(e_{01}-e_{02})$ is consequently executed when the discrimination signal indicates any sampling and holding circuit. The operated result $(e_{01}-e_{02})$ shows a crosstalk balance level. A track having a large crosstalk amount of the adjacent tracks is discriminated depending on whether the result of $(e_{01}-e_{02})$ is positive or negative. A degree of the crosstalk amount is known from the value of $(e_{01}-e_{02})$. The operated result $(e_{01}-e_{02})$ is supplied as a tilt error signal to the driving circuit 79 and the driving circuit 79 drives the tilt controlling motor 78 so that $(e_{01}-e_{02})$ is equal to almost zero (that is, the absolute value of $(e_{01}-e_{02})$ is minimized).

On the other hand, the output level $e_1$ of the photosensitive element 34 for receiving the reflected light of the spot light 65 is added with an output level $e_2$ of the photosensitive element 36 for receiving the reflected light of the spot light 67 by the adder 81. Since the output signal of the photosensitive element 36 is delayed by the delay element 82 before it is supplied to the adder 81, the level of the reflected light received by the photosensitive element 36 when the spot light 67 is positioned on the line in the disc radial direction where the spot light 65 is positioned is supplied to the adder 81. An output signal $(e_1+e_2)$ of the adder 81 is multiplied by K/2 by the multiplier 83. K is a constant as mentioned above. Since the crosstalk amounts from both of the neighboring tracks when there is no tilt in the disc are preliminarily known, K is set in accordance with to the crosstalk amounts. An output level of the multiplier 83, consequently, shows the crosstalk amount from the adjacent track and is supplied to the subtractor 85. The level $e_1$ of the reflected light received by the photosensitive element 35 when the spot light 66 is positioned on the line in the disc radial direction on which the spot light 65 is positioned is generated from the delay element 84. By subtracting $K(e_1+e_2)/2$ from the level eo by the subtractor 85, a read signal in which the crosstalk amount is eliminated can be obtained.

As means for detecting the crosstalk balance, the crosstalk balance is calculated from the photosensitive output of the central pit by using the reference pit in the embodiment for simplicity of explanation. The present invention, however, is not limited to the above case but can be also constructed in a manner such that the photosensitive outputs at the reading position of the central track and the adjacent tracks which are adjacent to the reading position are individually detected by a three-beam or one-beam pickup and the crosstalk balance is obtained on the basis of the respective detected outputs without providing any special reference pit as in the embodiment.

Further, although it is controlled so as to reduce the crosstalk balance by changing the tilt of the pickup in the embodiment, the present invention is not limited to the above case. The objective lens, collimator lens, and the like for constructing the pickup can be tilted or a phase difference can be given by a liquid crystal element. In short, any means for correcting the aberration as a cause of deteriorating the crosstalk balance as shown by the equation (1) can be used.

According to the present invention as mentioned above, the difference between the crosstalk amount of the signal recorded on the track located on the inner circumference side of the desired track to be read on the optical disc for the desired track and the crosstalk amount of the signal recorded on the track located on the outer circumference side of the desired track for the desired track is generated as a tilt error signal value indicative of the occurrence of the aberration, and the aberration is optically corrected on the basis of the tilt error signal value. Since the aberration is corrected on the basis of the crosstalk balance at the converging positions of the reproduction lights, the aberration (it can be recognized as a deterioration of the crosstalk balance) caused by the tilt of the disc can be cancelled more accurately than the tilt sensor. The present invention is, therefore, especially suitable for the reproduction of the optical disc realizing the high density recording.

The preferred embodiment of the present invention has been made. It will be obviously understood that those skilled in the art can presume many modifications and variations. All of the modifications and variations are incorporated in the scope of claims of the invention.

What is claimed is:

1. An optical pickup apparatus for optically reading a signal recorded on tracks of an optical disc by using a light beam and a photosensitive element, comprising:

crosstalk balance operating means for generating a difference between a first crosstalk amount to a desired track to be read on said optical disc by the signal recorded on the track locating on an inner circumference of said desired track and a second crosstalk amount to said desired track by the signal recorded on the track locating on an outer circumference of said desired track as a tilt error signal value indicative of an occurrence of an aberration, said crosstalk balance operating means including a comparing circuit and an operating circuit, wherein said comparing circuit compares an output of the photosensitive element at three different times to determine the first crosstalk amount and the second crosstalk amount, and wherein said operating circuit subtracts one of said first and second crosstalk amounts from the other of said first and second crosstalk amounts to generate said tilt error signal value; and correcting means for optically correcting said aberration in accordance with said tilt error signal value.

2. An apparatus according to claim 1, further comprising subtracting means for subtracting the crosstalk amount to said desired track by the signal recorded on the track locating on the inner or outer circumference of said desired track from the read signal of said desired track in order to obtain a real read signal.

3. An apparatus according to claim 1, wherein said correcting means includes a driving circuit in communication with said operating circuit, and a tilt control motor connected to said driving circuit.

4. An apparatus according to claim 1, wherein said crosstalk balance operating means further includes a sync pit detecting circuit which initiates the measurement of the output from the photosensitive element.

5. An optical pickup apparatus for optically reading a signal recorded on tracks of an optical disc by using a light beam and a photosensitive element, comprising:

a comparing circuit, wherein said comparing circuit compares an output of the photosensitive element at three different times to determine a first crosstalk amount to a desired track to be read on said optical disc by the signal recorded on the track locating on an inner circumference of said desired track and a second crosstalk amount to said desired track by the signal recorded on the track locating on an outer circumference of said desired track;

an operating circuit, wherein said operating circuit subtracts one of said first and second crosstalk amounts from the other of said first and second crosstalk amounts to generate a tilt error signal value indicative of an occurrence of an aberration; and a driving circuit, in communication with said operating circuit, which optically corrects said aberration in accordance with said tilt error signal value by driving a tilt control motor.

6. An apparatus according to claim 5, further comprising a sync pit detecting circuit which initiates the measurement of the output from the photosensitive element.

7. An apparatus according to claim 5, further comprising a subtractor which subtracts a crosstalk amount to said desired track by the signal recorded on the track locating on the inner or outer circumference of said desired track from the read signal of said desired track in order to obtain a real read signal.

* * * * *